3,207,717
THERMOSET COPOLYMERS
John E. Maier, St. Paul, Minn., assignor to Minnesota Mining and Manufacturing Company, St. Paul, Minn., a corporation of Delaware
No Drawing. Filed Dec. 21, 1959, Ser. No. 860,740
13 Claims. (Cl. 260—28)

This invention relates to new and useful compositions prepared from partially cured, thermosetting, hydrocarbonaceous resinous materials and heat-curable thermosetting resins.

It is an object of this invention to teach novel curable resin compositions which may be employed and utilized in various specialized applications requiring thermal and chemical stability. Illustrative applications for the utilization of these compositions are in the manufacture of reinforced plastic laminates, ablation applications such as in the manufacture of nose cones and jet and rocket nozzles, and as friction particles or friction binders such as in the manufacture of brake linings and transmission or clutch surfaces.

A further object of this invention is to teach various methods for preparing the novel compositions of this invention.

Another object of this invention is to teach thermoset resins which are resilient and have good thermal stability, as measured by the loss of volatiles at high temperatures.

The compositions of this invention are prepared by admixing a compatible, heat-reactive, thermosetting resin and a partially-cured, thermosetting, hydrocarbonaceous resinous material. The admixture may be described as a mixture of heat-curable resins which when cured are chemically combined to produce a thermoset copolymer having properties superior to those of the individually cured resins.

Due in part to their availability and low cost, B-stage phenolaldehyde resins are a preferred class of heat-reactive, thermosetting resins. These phenol-aldehyde resins are copolymers prepared by the condensation of an aldehyde i.e., formaldehyde, and a phenol in the presence of an alkaline or acidic catalyst.

Suitable phenolic compounds for the preparation of the phenol-aldehyde resins are phenol, cresols, xylenols, and various substituted phenols, such as those substituted in the para-position such as p-n-butyl phenol and p-tert-butyl phenol. Special mention is also made of phenols substituted in the meta-position with a long chain hydrocarbon radical, such as are contained in a naturally occurring liyuid extracted from the shells of cashew nuts, hereinafter referred to as cashew nut shell liquid, which consists of a mixture containing pentadecyl alkenyl meta-substituted phenolic materials i.e.

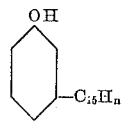

the major component, and

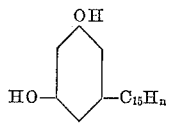

where n is 25, 27, 29 or 31. These phenols may be characterized by the formula ROH where R is an aryl or alkaryl radical.

Other aldehydes, such as furfural and acetaldehyde may also be employed to prepare the phenol-aldehyde resins.

Phenol-aldehyde resins are characterized by the presence of methylene bridges and methylol groups which result from the addition of the aldehyde to the aromatic nucleus. In their preparation the ratio of aldehyde to phenol is generally .65 to 1.2 equivalents of aldehyde to each equivalent of the phenolic compound. This type of resin is frequently modified with a wide variety of ingredients. Typical modifying materials are polyvinyl butyral, rosins, drying oils, and butyl phenols such as p-tert-butyl-phenol.

In the thermosetting of certain phenol-aldehyde reaction products, such as those of the Novalak type, methylene bridge donors are added to the mixtures. Hexamethylenetetramine is conventionally added for this purpose.

Other compatible, heat-reactive thermosetting resins are other methylol-containing condensation products, alkyd resins, and epoxy resins. Illustrative methylol-containing condensation products are melamine-aldehyde condensation products, urea-aldehyde condensation products, and guanidine-aldehyde condensation products.

The normally solid, partially-cured, thermosetting hydrocarbonaceous resinous material has a softening point of 140 to 250° C., preferably 150 to 200° C., and 25 to 60 percent by weight benzene-soluble components, preferably 35 to 50 percent. These hydrocarbonaceous resinous materials are prepared from hydrocarbon pitches. The preferred class of hydrocarbon pitches have a melting point in the range of 50 to 200° C. (preferably 75 to 150° C.), but may even be fluid at room temperature, and have a solubility in benzene of at least 70 percent by weight. These pitches are best exemplified by the suitable coal tar pitches. The hydrocarbon pitches utilized may also be identified as poly-nuclear aromatic-containing pitches which are essentially benzene-soluble. The chemical modification of the partially-cured, thermosetting hydrocarbonaceous resinous material is evidenced by the reduced benzene solubility of the partially-cured resin. In most cases the benzene solubility will be reduced at least 10 percent.

Various processes may be employed to prepare the partially-cured, thermosetting hydrocarbonaceous resinous materials. One method is to treat the hydrocarbon pitch with an oxidizing agent such as dinitrobenzene, the preferred oxidizing agent.

I have also discovered that phosphorus pentoxide and boron trioxide are useful compounds for preparing the partially-cured, thermosetting hydrocarbonaceous resinous materials. These compounds are, of course, not oxidizing agents and this invention is described with particular reference to modified hydrocarbon pitches prepared from these compounds as an alternative method for preparing the partially-cured, thermosetting hydrocarbonaceous resinous materials.

Fillers are frequently added to the resin mixtures of this invention as a reinforcing agent to give dimensional strength and stability. Illustrative inorganic fillers are graphite, clays, asbestos, glass filaments, mica, carbon, metal particles, barytes, alumina, titania, silica and glass cloth. Illustrative organic fillers are nylon, carbonized organic fibers, naturally-occurring cellulosic and proteinaceous materials such as shredded and pulverized wood and shell flours, and polyesters. These fillers may be particulate or fibrous. The fibrous fillers (filament or fabric) are especially useful in the preparation of reinforced plastic laminates.

As will be apparent, the compositions of this invention may also be prepared by the in situ formation of the thermosetting resinous materials.

This invention may be illustrated further by reference to the following examples in which all "parts" are expressed as parts by weight and all "percentages" are expressed as percent by weight, unless otherwise specified.

EXAMPLE 1

This example illustrates the preparation of the resin components of this invention and the preparation of the type of resilient thermoset resins which when cured in the presence of a filler were employed in the manufacture of brake linings of high durability. Their use in this application serves to illustrate the high thermal stability of products prepared from the mixture of thermosetting resins.

(A) *Preparation of the partially-cured, thermosetting, hydrocarbonaceous resinous materials*

Coal tar pitch (85 parts) having a melting point of 90° C. and benzene-soluble fraction of 75% and an acetone-soluble fraction of 58% was mixed with dinitrobenzene (15 parts). The mixture was heated to 350° F. in an oven. Over a period of 6 hours the temperature was gradually raised to 480° F. The resulting resin had a softening point of 162° C. as measured on a Parr bar and contained 35% benzene-soluble materials. When extracted with acetone and water, 35% and 1.5% of the resin, respectively, was extracted.

(B) *Prepartion of a phenol-aldehyde condensation product*

To a mixture of phenol (100 parts) and sulfuric acid (1 part) as a catalyst was added slowly formaldehyde (67 parts of a 37% aqueous solution) so as to maintain the temperature of the reactants at 100° C. The reaction mixture was then refluxed for 30 minutes and dehydrated at 120° C. and 25 mm. mercury pressure. The resulting resin had a softening point of 65° C. and could be pulverized at room temperature.

(C) *Preparation of cured thermoset copolymers*

The phenolic resin prepared in B above was pulverized with 10 parts of hexamethylenetetramine per 100 parts of phenolic resin. Five parts of this phenolic resin blend were then mixed with 5 parts of the partially-cured, thermosetting hydrocarbonaceous resinous material prepared in A above. This mixture was then cured at 500° F. for 4 hours to produce a hard, resilient thermoset copolymer which contained 1.34% of acetone extractable constituents and which had a volatile loss of 5% at 700° C. at the end of one hour and a volatile loss of 20% when heated for an additional hour at 1000° F.

The cured thermoset copolymer prepared as described above was ground to 40 mesh friction particles. A mixture of these particles (10 parts), a powdered thermosetting phenolic resin (20 parts), asbestos fiber (60 parts), and finely ground barytes (10 parts) was pressed into a brake lining band and cured at 350° F. for 4 hours.

Samples of the individual resins described in A and B above when cured separately for 4 hours at 500° F. contained 6.91% and 1.45% of acetone extractable constituents, respectively.

EXAMPLE 2

A phenol-aldehyde condensation product prepared as described in Example 1-B was alkylated by reacting the phenolic resin with 20% of cashew nut shell liquid in the presence of a small amount of sulfuric acid as a catalyst. This alkylated phenol was then pulverized with hexamethylenetetramine (10 parts per 100 parts of alkylated phenolic resin) and the blend was mixed with equal parts of the partially-cured, thermosetting hydrocarbonaceous resinous material prepared as described in Example 1-A. The mixture was cured at 500° F. for 4 hours which resulted in a thermoset copolymer containing less than 2% of constituents extractable by acetone and which had a volatile loss of 8% after being heated for one hour at 700° F. and a volatile loss of 27% after being heated at 100° F. for an additional hour.

EXAMPLE 3

A phenol-aldehyde condensation product prepared as described in Example 1-B was alkylated by reacting the phenolic resin with 33% of cashew nut shell liquid in the presence of a small amount of sulfuric acid as a catalyst. This alkylated phenol was then pulverized with hexamethylenetetramine (10 parts per 100 parts of alkylated phenolic resin) and the blend was mixed with equal parts of the partially-cured, thermosetting hydrocarbonaceous resinous material prepared as described in Example 1-A. The mixture was cured at 500° F. for 4 hours which resulted in a thermoset copolymer which contained 1.55% of constituents extractable by acetone.

The alkylated phenolic resin when cured at 500° F. for 4 hours in admixture with 10 parts of hexamethylenetetramine per 100 parts of resin contained 1.71% of constituent extractable by acetone.

EXAMPLE 4

Coal tar pitch having a melting point of about 100° C. was mixed with 20% by weight of phosphorus pentoxide ($P_2O_5$). The mixture was heated and stirred for 1⅔ hours at 200° C. to produce a phosphorus-containing, heat-curable, partially-cured, thermosetting hydrocarbonaceous resinous material. This resin had an acetone extractable fraction of 44%, a benzene extracable fraction of 33% and a water extractable fraction of 20%. The softening point (Parr bar) of this resin was 160° C.

Similar resins were prepared by reacting a mixture containing 10% phosphorus pentoxide for 8 hours at 220° C. and 15% phosphorus pentoxide for 6 hours at 220° C.

A thermoset resin was prepared by curing a partially-cured, thermosetting hydrocarbonaceous resinous material containing about 8% combined phosphorus at 500° F. for 4 hours. The resulting thermoset resin contained 24% acetone extractable constituents and had a volatile loss of less than 2% when heated to 700° F. for one hour and 22% after an additional hour of heating at 1000° F.

The phosphorus-containing, partially-cured, thermosetting hydrocarbonaceous resinous material prepared in the presence of 20% phosphorus pentoxide was mixed with equal parts of the phenolic resin prepared as described in 1-B above. This mixture after being pulverized was cured in an aluminum pan at 500° F. for 4 hours to produce a hard resilient thermoset copolymer containing 15% acetone extractables and which had a volatile loss of 12% when heated for one hour at 700° F. and a volatile loss of 30% when heated for an additional hour at 1000° F. Similar copolymers were obtained by curing the phosphorus-containing, partially-cured, thermosetting hydrocarbonaceous resinous materials with the thermosetting cashew nut shell liquid alkylated phenolic resin described in Examples 2 and 3.

EXAMPLE 5

Coal tar pitch having a melting point of about 100° C. was mixed with 25% by weight of boron trioxide ($B_2O_3$). The mixture was heated and stirred for 12 hours at 250° C. to produce a boron-containing, heat-curable, partially-cured, thermosetting, hydrocarbonaceous resinous material. This resin had an acetone extractable fraction of 50%, a benzene extractable fraction of 25% and a water extractable fraction of 24%. The softening point (Parr bar) of this resin was 189° C.

Similar resins were prepared by reacting a mixture containing 15% boron trioxide for 20 hours at 250° C. and 20% boron trioxide for 20 hours at 250° C.

A thermoset resin was prepared by curing a partially-cured, thermosetting hydrocarbonaceous resinous material containing about 8% combined boron at 500° F. for 4 hours. The resulting thermostat resin contained 15% acetone extractable constituents and had a volatile loss of less than 2% when heated at 700° F. for one hour and 9% after an additional hour of heating at 1000° F.

The boron-containing, partially-cured, thermosetting hydrocarbonaceous resinous material prepared in the presence of 25% boron trioxide was mixed with equal parts of the phenolic resin prepared as described in 1–B above. This mixture after being pulverized was cured in an aluminum pan at 500° F. for 4 hours to produce a hard resilient thermoset copolymer containing 12% acetone extractables and which had a volatile loss of 5% when heated for one hour at 700° F. and a volatile loss of 16% when heated for an additional hour at 1000° F. Similar copolymers were obtained by curing the boron-containing, partially-cured, thermosetting hydrocarbonaceous resinous materials with the cashew nut shell liquid alkylated phenolic resin described in Examples 2 and 3.

EXAMPLE 6

This example illustrates the in situ formation of the heat-curable phenolic resin.

Cashew nut shell liquid (100 parts), paraformaldehyde (8 parts) and cresol sulfonic acid (5 parts) were blended with 100 parts by weight of three different partially-cured, thermosetting, hydrocarbonaceous resinous materials, namely those prepared as described in Examples 1–A, 4 and 5. An exotherm developed upon mixing the ingredients and a gel was formed in about 20 minutes. The uncured, gelled compositions were then thermoset under varying conditions.

In each instance hard, resilient, thermoset copolymers resulted which had physical characteristics substantially identical to those copolymers prepared from pre-formed phenolic resins. More important is the fact that loss of volatiles at elevated temperatures was much lower for the copolymer than the thermoset phenolic by itself.

EXAMPLE 7

Mixtures containing equal parts of a partially-cured, thermosetting, hydrocarbonaceous resinous material prepared as described in Example 1–A and as the second thermosetting resin (1) a urea-formaldehyde resin, (2) a melamine-formaldehyde resin and (3) an epoxy resin, a condensation product of epichlorohydrin and bisphenol-A-containing 1,2-oxirane oxygen groups and having an epoxide equivalent weight of about 200, were prepared and cured for 4 hours at 500° F. In the case of each resin hard, resilient, copolymers were obtained which had good thermal stability as evidenced by their loss of volatiles when heated at 700° F. and 1000° F.

When subjected to the same curing conditions, the epoxy resin remained uncured and was totally soluble in acetone.

Mixtures of the thermosetting resins could of course also be employed in admixture with the partially-cured, thermosetting hydrocarbonaceous resinous materials.

EXAMPLE 8

This example illustrates that the mixture of thermosetting resins employed may vary over a wide range.

Blends containing 25% and 75% of the phenolic resin described in Example 2 were prepared with the partially-cured, thermosetting hydrocarbonaceous resinous materials described in Examples 1–A, 4 and 5. These blends were cured for 4 hours at 500° C. to produce thermoset, hard resilient copolymers having low volatile losses at elevated temperatures.

Blends containing as little as 5% of the partially-cured, thermosetting hydrocarbonaceous resinous materials may be employed to advantage.

Upon ashing, particles of the thermoset copolymers of this invention do not sinter except when in admixture with some second component that may cause them to fuse together. On the other hand, thermoset particles of the individual resinous materials do sinter.

I claim:

1. Composition of matter comprising at least 5% by weight of a normally solid, thermosetting, polynuclear aromatic containing, hydrocarbonaceous resinous material having a softening point of 140° C. to 250° C. and containing 25 to 60 percent benzene-soluble components and a second thermosetting resin compatible with said hydrocarbonaceous resinous material and selected from the group consisting of phenol-aldehyde condensation products, urea-aldehyde condensation products, melamine-aldehyde condensation products and epoxy resins.

2. The composition of claim 1 in which said second thermosetting resin is a phenol-aldehyde condensation product.

3. The composition of claim 1 in which said second thermosetting resin is a melamine aldehyde condensation product.

4. The composition of claim 1 in which said second thermosetting resin is a urea-aldehyde condensation product.

5. The composition of claim 1 in which said hydrocarbonaceous resinous material is resinified coal tar pitch.

6. Composition of matter comprising at least 5% by weight of a normally solid, thermosetting, poly-nuclear aromatic containing, hydrocarbonaceous resinous material having a softening point of 150° C. to 200° C. and containing 35 to 50 percent benzene-soluble components and a second thermosetting resin compatible with said hydrocarbonaceous resinous material and selected from the group consisting of phenol-aldehyde condensation products, urea-aldehyde condensation products, melamine-aldehyde condensation products and epoxy resins.

7. Composition of matter comprising at least 5% by weight of a normally solid, thermosetting, polynuclear aromatic containing, hydrocarbonaceous resinous material having a softening point of 140° C. to 250° C. and containing 25 to 60 percent benzene-soluble components, a B-stage, heat curable thermosetting phenol-formaldehyde condensation product compatible with said hydrocarbonaceous resinous material and a methylene bridge donor.

8. Composition of matter comprising at least 5% by weight of a normally solid, thermosetting, polynuclear aromatic containing, hydrocarbonaceous resinous material having a softening point of 140° C. to 250° C. and containing 25 to 60 percent benzene-soluble components, a B-stage, heat curable thermosetting phenol-formaldehyde condensation product compatible with said hydrocarbonaceous resinous material and an inorganic filler.

9. A thermoset copolymer of at least 5% by weight of a normally solid, thermosetting, polynuclear aromatic containing, hydrocarbonaceous resinous material having a softening point of 140° C. to 250° C. and containing 25 to 60 percent of benzene-soluble components and a second thermosetting resin compatible with said hydrocarbonaceous resinous material and selected from the group consisting of phenol-aldehyde condensation products, urea-aldehyde condensation products, melamine-aldehyde condensation products and epoxy resins.

10. Composition of matter comprising particles of a thermoset copolymer of at least 5% by weight of a normally solid, thermsetting, polynuclear aromatic containing, hydrocarbonaceous resinous material having a softening point of 140° C. to 250° C. and containing 25 to 60 percent of benzene soluble components, a thermosetting phenolic resin, another thermosetting resin compatible with said hydrocarbonaceous resinous material and selected from the group consisting of phenol-aldehyde condensation products, urea-aldehyde condensation products, malamine-aldehyde condensation products and epoxy resins, and asbestos.

11. A process for preparing a thermoset resinous material which comprises mixing at least 5% by weight of a normally solid, thermosetting, polynuclear aromatic containing, hydrocarbonaceous resinous material having a softening point of 140° C. to 250° C. and containing 25 to 60 percent benzene-soluble components, and a thermosetting phenol-aldehyde condensation product compatible with said hydrocarbonaceous resinous material, and heating the mixture at a temperature of about 500° F.

12. A process for preparing a thermoset resinous material which comprises mixing at least 5% by weight of a normally solid, thermosetting, polynuclear aromatic contaning hydrocarbonaceous resinous material having a softening point of 140° C. to 250° C. and containing 25 to 60 percent benzene-soluble components, and a phenol and an aldehyde and heating the mixture at a temperature of about 500° F., the equivalent ratio of aldehyde to phenol being from 0.65 to 1.2.

13. Composition of matter comprising at least 5% by weight of a normally solid, thermosetting, polynuclear aromatic containing resinified coal tar pitch having a softening point of 140° C. to 250° C. and containing 25 to 60 percent benzene-soluble components and a thermosetting phenol-aldehyde condensation product compatible with said resinified coal tar pitch.

References Cited by the Examiner

UNITED STATES PATENTS

| | | | |
|---|---|---|---|
| 2,052,779 | 9/36 | Lidkea et al. | 260—28 |
| 2,409,258 | 10/46 | Davis et al. | 260—28 |
| 2,485,327 | 10/49 | Snow | 260—28 |
| 2,500,208 | 3/50 | Shea et al. | 106—284 |
| 2,853,460 | 9/58 | Archibald | 260—38 |
| 2,861,307 | 11/58 | Froberger | 260—38 |
| 2,861,895 | 11/58 | Hardman | 260—28 |
| 2,992,935 | 7/61 | Winslow | 106—284 |

OTHER REFERENCES

"Asphalts and Allied Substances" (Abraham), 1920, published by D. Van Nostrand Co., New York, pages 251–255 relied on.

MORRIS LIEBMAN, *Primary Examiner.*

ALLAN M. BOETTCHER, MILTON STERMAN, ALEXANDER H. BRODMERKEL, *Examiners.*

UNITED STATES PATENT OFFICE

CERTIFICATE OF CORRECTION

Patent No. 3,207,717                      September 21, 1965

John E. Maier

It is hereby certified that error appears in the above numbered patent requiring correction and that the said Letters Patent should read as corrected below.

Column 1, line 50, for "liyuid" read -- liquid --; column 4, line 2, for "100° F." read -- 1000° F. --; column 5, line 2, for "thermostat" read -- thermoset --.

Signed and sealed this 7th day of February 1967.

(SEAL)
Attest:

ERNEST W. SWIDER                      EDWARD J. BRENNER
Attesting Officer                        Commissioner of Patents